Aug. 21, 1928.
E. G. BUSSE
1,681,463
SAFETY GUARD
Filed May 15, 1925  3 Sheets-Sheet 3
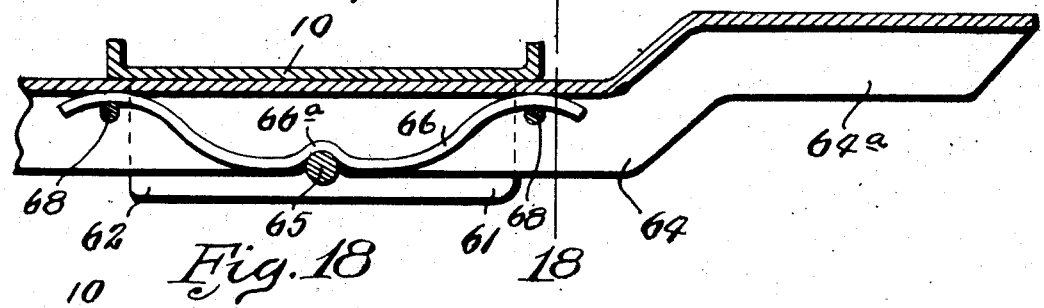
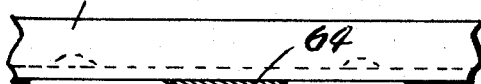
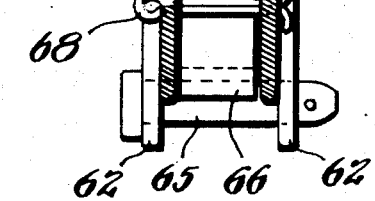
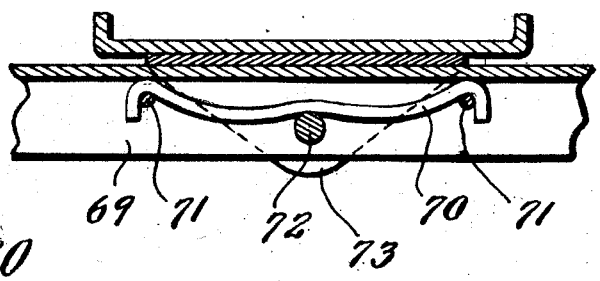
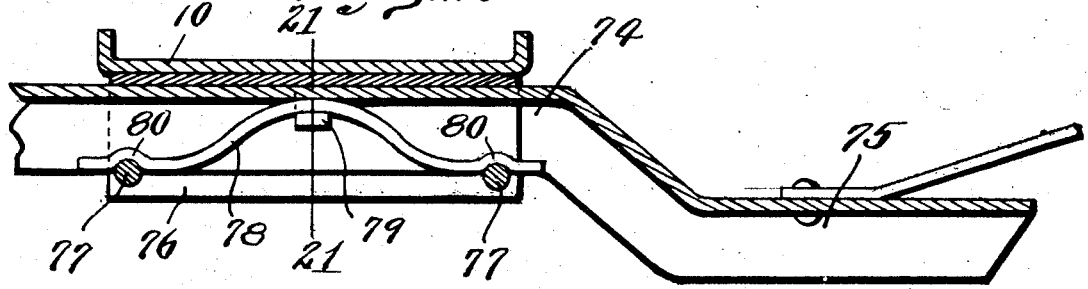
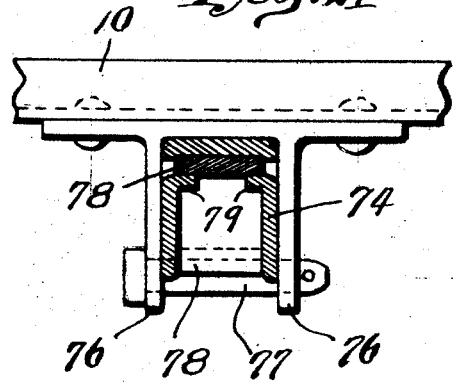
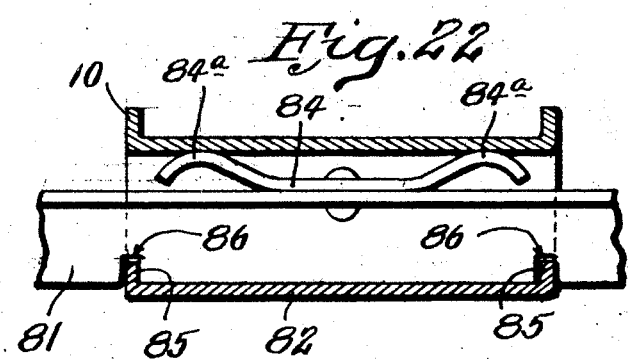
Inventor
Edwin G. Busse
By Cornwall, Bidell & Janne
Att'ys.

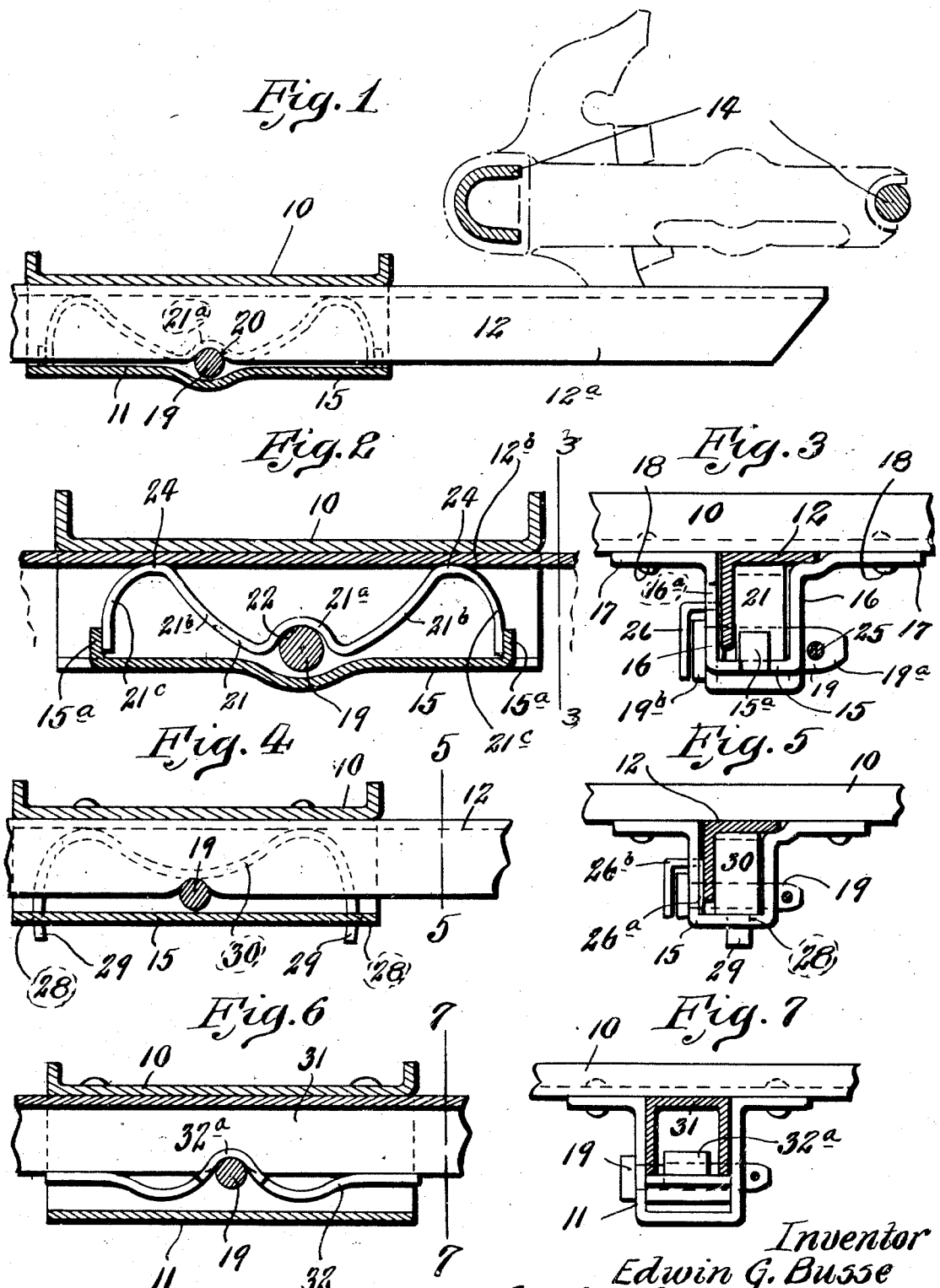

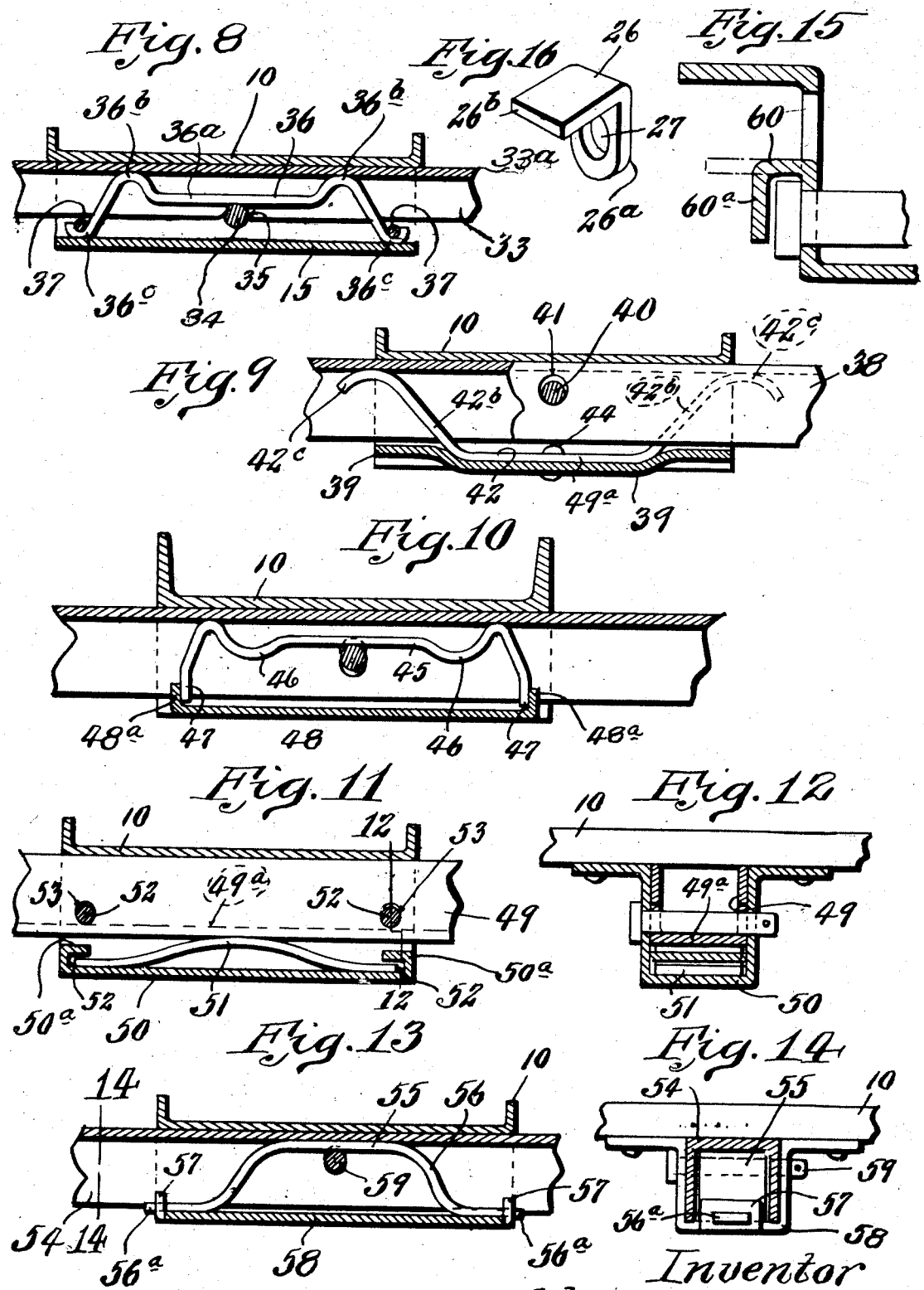

Patented Aug. 21, 1928.

1,681,463

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY GUARD.

Application filed May 15, 1925. Serial No. 30,490.

This invention relates to new and useful improvements in brake beam safety supports and guards and attaching means therefor, the object being to provide simple and efficient means for positively attaching the safety guard or support in position and hold it to its seat under spring pressure, thereby preventing rattling of the parts and the consequent wear on the fastening devices.

Further objects of the invention are to provide a mounting and brake beam safety bar, said mounting having a resilient member adapted to yieldingly engage said safety bar and hold it to its seat.

Other objects of the invention are to provide simple means carried by the mounting and adapted to be seated in said bar for locking the latter in position and to provide means arranged adjacent to the head of the pin or bolt used for locking the safety bar to the mounting, said means being adapted to have a portion thereof bent or moved in a position adjacent to said head to prevent the withdrawal of said pin.

With these and other objects in view, my invention consists in certain novel features of construction and arrangement of parts, hereinafter more fully described and claimed, and illustrated in the accompanying drawings, in which—

Figure 1 is a side elevational view of a safety bar as applied to the spring plank and underlying a brake beam.

Figure 2 is an enlarged cross section taken longitudinally through said bar and through the mounting therefor.

Figure 3 is a transverse cross section taken on line 3—3 of Figure 2.

Figure 4 is a fragmental side elevational view of a safety bar showing a modified form of mounting for the same.

Figure 5 is a vertical cross section taken on line 5—5 of Figure 4.

Figure 6 is a detail view showing a modified form of mounting used in conjunction with a channel-shaped safety bar.

Figure 7 is a vertical cross section taken on line 7—7 of Figure 6.

Figure 8 is a detail view showing another modified form of mounting.

Figure 9 is a side elevational view of a safety guard partly in cross section and showing another modified form of mounting.

Figures 10 and 11 are longitudinal sectional views showing other modified forms.

Figure 12 is a vertical cross section taken on line 12—12 of Figure 11.

Figure 13 is another modified form of mounting.

Figure 14 is a vertical cross section taken on line 14—14 of Figure 13.

Figure 15 is a detail view showing a portion of the wall of the mounting struck out and bent to secure the pin against withdrawal.

Figure 16 is a perspective detail view of a pin lock shown in Figures 2 and 3.

Figure 17 is a longitudinal cross section of another modified form of safety bar.

Figure 18 is a vertical cross section taken on lines 18—18 of Figure 17.

Figure 19 is a longitudinal cross section of another modified form.

Figure 20 is a longitudinal cross section of a safety bar provided with depressed ends.

Figure 21 is a transverse cross section taken on lines 21—21 of Figure 20.

Figure 22 shows another modified form of supporting means for the safety bar.

Referring by numerals to the accompanying drawings, 10 indicates a spring plank to the underside of which is fixed a mounting 11 which detachably carries a safety guard or support 12. This safety guard, which may be rigid or flexible or comprise a combination of a rigid and flexible part, and may be of any desired cross section, extends from said mounting beneath a brake beam 14, as shown in Figure 1. Mounting 11 is preferably formed box-shape in cross section having a bottom wall 15, side walls 16, and laterally projecting flanges 17 which latter are secured to the spring plank by suitable fastening devices 18. Side walls 16 are provided with aligned apertures, preferably centrally located from the ends of said mounting for receiving a pin 19.

Safety bar 12, which, in the present instance, is formed angular in cross section, is provided in the edge of its depending flange 12ª with a recess or seat 20 which, when said bar is in position, coincides with the apertures formed in the side walls of the mounting and is adapted to receive pin 19 whereby said bar 12 is held against longitudinal movement. In order to hold bar 12 under spring pressure to its seat and prevent vibration thereof while in service, a spring member 21 is arranged in said mounting and is provided with a plurality of bearing points engaging, respectively, the mounting and said bar, thereby yieldingly holding said bar in position.

In the form shown in Figures 1 to 3, this resilient member is provided with a transversely disposed bend 21ᵃ which forms a downwardly presented seat 22 adapted to be engaged by pin 19. The intermediate portions 21ᵇ of member 21 are then bent upwardly to provide bearing points 24 for engaging the lower face of the horizontally disposed flange 12ᵇ of bar 12. The end portions 21ᶜ are then bent downwardly with the extremities thereof presented against the bottom wall 15 and bearing against lips 15ᵃ struck from said wall 15 and bent upwardly at right angles thereto to retain said ends 21ᵈ in position. The entering end of pin 19 is formed tapered as indicated at 19ᵃ in order to facilitate the insertion of said pin in position and engage and raise the central bend 21ᵃ upwardly out of the path of said pin, thereby increasing the tension of member 21. Said end 19ᵃ is apertured to receive a cotter pin or similar device 25.

In order to safeguard against accidental withdrawal of pin 19, a bracket 26, having a vertically disposed portion 26ᵃ and a horizontally disposed portion 26ᵇ, is provided and is placed in said housing with the horizontal portion 26ᵇ projecting outwardly through an aperture 16ᵃ formed in one of the side walls 16 as shown in Figure 3. The vertical portion 26ᵃ is provided with an opening 27 for receiving the shank of pin 19. Bracket 26 is placed in position by the insertion of pin 19 and after said pin has been placed in position horizontal portion 26ᵇ is bent downwardly against the head 19ᵇ of pin 19, thereby forming a secure lock for retaining said pin in place.

In the form shown in Figures 4 and 5, the bottom wall 15 of mounting 11 is provided with apertures 28 through which projects outwardly and downwardly the reduced ends or lips 29 of a resilient member 30, thereby preventing removal of said resilient member from the mounting.

In the form shown in Figures 6 and 7, a safety bar 31 of inverted channel-shape is held yieldingly in position by a resilient member 32, the ends of which bear against the downwardly presented edges of said bar and hold the latter to its seat. The central portion of member 32 is reduced in width and extends upwardly between the depending flanges of member 31 as indicated at 32ᵃ and forms a seat which is adapted to be engaged by pin 19, which is seated in said mounting and engages seats formed in the edges of said bar 31. In this form, as in the preceding forms, the safety or support element is provided with notches or seats for engagement with pin 19 or its counterpart. The resilient member in each of these forms has one or more points of engagement, respectively, with the mounting element and the resilient element, thereby yieldingly holding the latter to its seat and eliminating vibration thereof. Each resilient element has a portion adapted to be engaged and stressed by the attaching pin in order to increase the spring pressure applied to the support bar.

In the form shown in Figure 8, a channel-shaped bar 33 is used and is held in position by a pin 34 which passes through the side walls of the mounting and through seats 35 formed in the depending flanges of bar 33. A resilient member 36 has an intermediate horizontally disposed portion 36ᵃ which is adapted to be engaged by said pin 34 to increase the tension of member 36, and the ends of said horizontal portions are bent upwardly and then downwardly to form upwardly presented bends or bearing portions 36ᵇ which bear against the underside of a horizontally disposed web portion 33ᵃ of bar 33. The ends of member 36 are bent downwardly and terminate in semi-circular portions 36ᶜ which bear against the bottom wall 15 of mounting 11. Occupying said semi-circular portions and passing through the side walls of housing 11 are cotter pins or other suitable devices 37 which prevent the displacement of the ends of the resilient member 36.

In the form shown in Figure 9, an inverted channel-shaped safety bar 38 is held in position in a mounting 39 by means of a pin 40 which is carried by the side walls of said mounting and passes through apertures 41. A resilient member 42 has its horizontal portion 42ᵃ resting on the bottom wall of housing 39 and is provided with upwardly and outwardly inclined portions 42ᵇ, the ends of which are curved as indicated at 42ᶜ and bear against the horizontally disposed web portion of member 38, thereby yieldingly holding said bar in place, aperture 41 being slightly larger than the diameter of pin 40 in order to permit this yielding movement of said bar. The ends of the bottom wall of housing 39 are offset inwardly and upwardly adjacent to the resilient member 42 in order to prevent the displacement thereof from said mounting. However, if desired, said member 42 may be secured in position in the mounting by a rivet 44.

The form shown in Figure 10 is similar to the form shown in Figure 8 with the exception that the resilient member 45 is provided with additional transversely disposed curves 46 in its length in order to increase the resiliency thereof and in that the ends 47 of said member extend downwardly against the bottom wall of mounting 48 and are held in position thereon by tongues 48ᵃ which are struck from the ends of the bottom wall of said mounting and are bent inwardly and upwardly to form projections for engaging said ends 47.

In the modified form shown in Figures 11 and 12, a safety bar 49, which is channel-shape in cross section, is placed in the mounting 50 with the flanges presented upwardly and the web portion 49ª thereof engaging the upwardly curved resilient member 51, the ends of which are slidably arranged in recesses 52 formed by rebending portions 50ª of the bottom wall of mounting 50. Bar 49 is secured in position in the mounting by pins 52 disposed adjacent to each end of said mounting and traversing apertures 53 formed in the flanges of said bar 49.

In the modified form shown in Figures 13 and 14 a safety bar 54 is placed in position in the mounting with its horizontally disposed portion resting against the underside of spring plank 10 and the intermediate portion 55 of a resilient member 56 bearing against said horizontal portion of said bar. The ends of resilient member 56 are bent downwardly and terminate in reduced portions 56ª which project outwardly through upstanding flanges 57 formed integral with the ends of the bottom wall of mounting 58, thereby preventing displacement of said resilient member. A single pin 59 passes through coinciding apertures formed in the vertically disposed portion or portions of member 54 and through the side walls of mounting 58 and bears against the underside of intermediate portion 55, thereby insuring contact thereof with the horizontal portion of bar 54.

In Figure 15 is shown a modified form of the locking means for the mounting pin, said means consisting of a lip or portion 60 struck from said wall of the mounting and bent laterally as shown in dotted lines in said figure. When the pin is in position, the extreme portion of said tongue is bent downwardly in front of the head of said pin as indicated at 60ª, thereby preventing withdrawal of the pin from position.

In the forms shown in Figures 17 and 18, a mounting 61 is provided with vertically disposed parallel walls 62, between which is adapted to be arranged a safety bar 64 which, in the present instance, is of channel form and is provided with raised end portions 64ª. Bar 64 is supported in position in the mounting 61 by a pin 65 which is seated in suitable apertures formed in walls 62 and engages seats formed in the downwardly presented edges of member 64, thereby securing the latter against longitudinal movement. A resilient member 66 having a centrally disposed downwardly presented seat 66ª is attached to bar 64 by cotter pins or other suitable devices 68 which secure the ends of said member 66 against the horizontal web portion of said channel member 64. When pin 65 is in position, it engages seat 66ª displacing it upwardly out of its normal position, thereby increasing the tension of member 66. Thus member 64 is resiliently held to its seat by member 66, thereby eliminating vibration of parts.

In the form shown in Figure 19, a bar 69 is provided with a resilient member 70 and held in position therein by pins 71 which engage the ends of said resilient member, the intermediate or bow portion of said member being adapted to be engaged by a pin 72 which is seated in the vertically disposed walls of a bracket 73 and passes through the apertures formed in the downwardly disposed flanges of channel member 69.

In the form shown in Figures 20 and 21, a safety bar 74 is provided with depressed portions 75 and is held in position in mounting 76 by pins 77 which are seated in said mounting and are adapted to be engaged by notches or seats formed in the downwardly presented edges of bar 74. A resilient member 78 having an upwardly curved portion 78ª engaging the web portion of bar 74 is held in position in said bar by lips 79 which are struck out from the flanges of bar 74 and are bent inwardly to engage the underside of member 78, thereby holding the latter in position. The ends of member 78 extend horizontally and outwardly and are provided with downwardly and transversely presented seats 80 adapted to be engaged by pins 77 when the latter are placed in position in mounting 76. In this form, as well as in the forms shown in Figures 17 and 19, the lower ends of the vertically disposed walls are left open in order to permit the insertion of the safety bar upwardly between said walls. Such a construction is necessary in cases where the safety bar is formed with raised or depressed portions, in which cases, it is impossible to insert the safety bar longitudinally through the mounting.

In the form shown in Figure 22, the safety bar 81 is seated in a box-shape mounting 82 and is held against vibration and displacement by a resilient member 84 which is attached at its central portions to the top wall of member 81 and has its ends 84ª bent upwardly for engaging the horizontal wall of a spring plank 10. The bottom wall 82ª of mounting 82 is provided at its ends with upwardly turned portions 85, which are adapted to engage and be seated in notches 86 formed in the vertically disposed wall or walls of bar 81. When bar 81 is in position, projections 85 occupy notches 86, thereby preventing movement of said bar, and spring 84 attached to said bar and bearing against the top wall of the spring plank or the mounting prevents the displacement of said bar. To remove the bar from the mounting, said bar is pressed upwardly against the influence of spring 84, thereby bringing notches 86 out of engagement with portions 85, whereupon said bar can be withdrawn longitudinally.

In all of the forms, the safety bar is held in position in the mounting positively by means which are carried by said mounting and engage a seat or seats formed in the bar. The resilient member used in each form acts as an additional support and yieldingly holds the bar in its seat, thereby preventing vibration and rattling of the parts and eliminating wear and tear on the fastening devices.

The resilient member is so arranged with respect to the position occupied by the pin used to secure the bar in position that the insertion of said pin in position displaces or tensions portions of said resilient member, thereby forcing the spring under tension and increasing the spring pressure interposed between the bar and the mounting.

I claim:

1. A safety guard for brake beams comprising a mounting having parallel side walls, a beam engaging member provided with a horizontally disposed portion, a pin carried by said mounting and extending transversely of said walls for engaging said member, the flange of the latter being provided with a seat for receiving said pin, and a resilient member having a fixed bearing and yieldingly engaging the horizontally disposed portion of said member.

2. A safety support for brake beams comprising a mounting having parallel wall portions, a beam engaging member extending longitudinally through said mounting, a pin carried by said mounting and extending transversely of said member, said member being provided with a seat for receiving said pin, and a resilient member arranged longitudinally in said mounting and bent to provide a plurality of bearing points for yieldingly supporting said member.

3. A safety support for brake beams comprising a mounting adapted to be fixed to a car truck part, a safety member seated in said mounting, a resilient member in cooperative engagement with said mounting and said safety member, and a member seated in said mounting and said safety member and adapted to engage said resilient member for placing the latter under tension.

4. A safety guard for brake beams comprising in combination a mounting adapted to be fixed to a car truck part, a safety member seated in said mounting and extending longitudinally thereof, a pin carried by said mounting and extending transversely of said safety member and engaging a seat formed therein, a resilient means interposed between said safety member and said pin for holding said safety member against vibration, and means arranged adjacent to the head of said pin and adapted to be bent against said head for preventing the displacement of sid pin.

5. A safety guard for brake beams comprising in combination a mounting adapted to be fixed to a car truck part, a safety bar seated in said mounting and extending longitudinally thereof, a pin carried by said mounting and extending transversely of said safety bar and engaging the same, a resilient member having points of engagement with said pin and with said safety bar for holding the latter to its seat under tension, and means for locking said pin against displacement.

6. A safety guard for brake beams comprising in combination a mounting having a pair of vertically disposed spaced walls, a flanged safety bar seated in said mounting between said walls, a resilient bar supporting member in engagement with said mounting and said bar and adapted to be distorted by the longitudinal insertion of said bar in position in said mounting, thereby increasing the tension of said resilient member, and means engaging said mounting and said bar for positively attaching the latter to said mounting.

7. A safety guard for brake beams comprising a mounting, a safety bar seated in said mounting, a resilient member interposed between said mounting and said safety bar for carrying the latter, and removable means for engaging and distorting said resilient member when the latter is in position, thereby increasing the tension thereof.

8. A safety guard for brake beams comprising a mounting adapted to be fixed to a car truck part, a safety bar seated in said mounting, a resilient member carried by one of said elements and engaging the other, and a removable pin seated in said mounting and engaging a seat formed in said safety bar, said pin being adapted to engage said resilient member and distort a portion thereof for increasing the spring pressure applied to said mounting and said safety bar.

9. A supplemental support for brake beams comprising a mounting element, a support element seated in the first element, a resilient member having a point of engagement with one element and operatively engaging the other element for yieldingly supporting said support element, and a member removably seated in said mounting and adapted to engage and distort a portion of said resilient member for forcing the latter into tension engagement with said elements.

10. A safety guard for brake beams comprising in combination a mounting box-shaped in cross section, a safety bar seated in said mounting, a resilient member disposed longitudinally in said housing and having points of engagement with said housing and said bar for yieldingly supporting the latter in position, and means engaging a transverse seat in said bar for preventing the movement thereof in longitudinal direction.

11. In a brake beam safety guard, the combination with a car truck part, of a walled mounting secured to said car truck part, a brake beam safety bar arranged longitudinally in said mounting and provided with a transversely disposed seat, and resilient means carried by said mounting for yieldingly holding said bar, said means including a transversely disposed member for engaging the seat in said bar and holding the latter against longitudinal movement.

12. A brake beam safety guard comprising a mounting adapted to be affixed to a car truck part, a safety guard member carried by said mounting, and a resilient member in interlocking and yielding engagement with said mounting and said safety guard member for preventing the vibration of the latter.

13. A brake beam safety guard comprising a mounting element adapted to be affixed to a truck element, a safety bar carried by said mounting and underlying a brake beam, and a resilient member in yielding interlocking engagement with said safety bar and one of said elements for locking said bar against movement and preventing vibration thereof.

14. A brake beam safety guard and support comprising a truck element, a mounting element secured thereto, a safety bar carried by said mounting element, and a resilient member disposed longitudinally of said bar and in interlocking engagement with said bar and one of said elements for preventing displacement of said bar, said resilient member yieldingly bearing against said bar to prevent vibration thereof.

15. A brake beam safety support comprising a truck element, a mount element secured thereto, a safety bar supported in said mount element, a resilient member in interlocking yielding engagement with said bar and one of said elements for preventing vibration of said bar, and means for maintaining said resilient member in interlocking engagement with said bar and said element.

16. In a device for supporting or guiding a brake beam, a mounting member adapted to be fixed to a car truck part, a bar extending through said member and seated therein, a detachable element carried by said member below said bar, and an elastic member having points of engagement with said element and bar for supporting the latter and yieldingly holding it to its seat.

17. In combination, a truck part, a bracket below the same, a removable support element in said bracket, a bar, adapted to support a brake beam, extending through said bracket above said element, and a yielding member between said element and bar for holding the latter in position.

18. In a device for supporting or guiding a brake beam, a mounting member with vertical sides and adapted to be secured to a truck part, a bar extending through said member and seated therein and adapted to support a brake beam, a spring carried by said member and holding said bar in position, and an element inserted laterally through said sides of said member and serving thereby to distort said spring to increase its pressure on said bar.

19. In a device for supporting or guiding a brake beam, a mounting member adapted to be rigidly fixed to a truck part, a bar extending through said member, and a spring element carried by said member and serving to yieldingly support said bar at points spaced longitudinally of said member and bar.

20. In a device for supporting or guiding a brake beam, a mounting member adapted to be fixed to a truck part and including a fixed supporting surface spaced below said truck part, a bar extending through said member, a spring element carried on said surface and serving to yieldingly support said bar, and means for increasing the distortion of said spring after the above-mentioned parts are assembled.

In testimony whereof I hereunto affix my signature, this 8th day of May, 1925.

EDWIN G. BUSSE.